(12) United States Patent
Normyle

(10) Patent No.: US 10,960,867 B2
(45) Date of Patent: Mar. 30, 2021

(54) MOTORCYCLE PARKING BRAKE DEVICE

(71) Applicant: Bullet Brake LLC, Buford, GA (US)

(72) Inventor: Stephen Eric Normyle, Sugar Hill, GA (US)

(73) Assignee: Bullet Brake, LLC, Buford, GA (US)

( * ) Notice: Subject to any disclaimer, the term of this patent is extended or adjusted under 35 U.S.C. 154(b) by 122 days.

(21) Appl. No.: 16/284,149

(22) Filed: Feb. 25, 2019

(65) Prior Publication Data

US 2019/0263372 A1 Aug. 29, 2019

Related U.S. Application Data

(60) Provisional application No. 62/634,882, filed on Feb. 25, 2018.

(51) Int. Cl.
*B60T 15/04* (2006.01)
*B60T 17/04* (2006.01)
*B62L 3/02* (2006.01)

(52) U.S. Cl.
CPC .......... *B60T 15/041* (2013.01); *B60T 17/043* (2013.01); *B62L 3/023* (2013.01)

(58) Field of Classification Search
CPC ...... B60T 15/041; B60T 17/043; B62L 3/023; B62L 3/06; B62L 3/02; B62L 3/026
USPC ....... 303/9.65, 5, 191, 89; 188/24.22, 24.11, 188/344; 60/568, 574, 584, 585, 588
See application file for complete search history.

(56) References Cited

U.S. PATENT DOCUMENTS

| | | | | |
|---|---|---|---|---|
| 2,472,442 A | * | 6/1949 | Schueler | B62L 3/02 74/489 |
| 2,803,425 A | * | 8/1957 | Little | F16K 31/52425 251/257 |
| 3,948,361 A | * | 4/1976 | Carlson | B62L 3/06 188/24.18 |
| 4,002,084 A | | 1/1977 | Martins | |
| 5,327,724 A | * | 7/1994 | Tribuzio | B60R 25/08 303/89 |
| 6,336,328 B1 | | 1/2002 | Inami et al. | |
| 7,726,747 B2 | * | 6/2010 | Weber | B60T 17/04 303/137 |
| 7,766,432 B2 | | 8/2010 | Hinz et al. | |
| 7,802,661 B2 | | 9/2010 | Ishida | |
| 7,909,415 B2 | * | 3/2011 | Weber | B60T 17/04 303/137 |

(Continued)

*Primary Examiner* — Pamela Rodriguez
(74) *Attorney, Agent, or Firm* — Baker, Donelson, Bearman, Caldwell & Berkowitz, PC; Dorian B. Kennedy

(57) ABSTRACT

There is disclosed a motorcycle parking brake device adapted to be mounted to the master cylinder of a braking system. The brake device includes a bolt portion with a stem portion which extends to a head having a flange. The stem portion includes a threaded portion, a cylindrical first seat, a recessed portion, and a second seat. The stem portion has a stem channel with an O-ring slot containing an O-ring seal. A hydraulic fluid opening extends through the recessed portion and into the stem channel. The central stem channel extends to a head channel. A plunger is coupled to the bolt portion for reciprocal movement between a disengaged position and an engaged position. The plunger has a shank, a piston, and a push plate. The brake device also has a seal fitted about the second seat and a resilient D-ring seal fitted about the first seat.

20 Claims, 4 Drawing Sheets

(56) References Cited

U.S. PATENT DOCUMENTS

| | | | |
|---|---|---|---|
| 8,046,996 B2 * | 11/2011 | Dunlap, III | B60T 11/236 |
| | | | 60/594 |
| 8,146,697 B2 | 4/2012 | Tahara et al. | |
| 8,167,382 B2 | 5/2012 | Tahara et al. | |
| 8,235,472 B2 | 8/2012 | Tanabe et al. | |
| 8,276,997 B2 | 10/2012 | Tahara et al. | |
| 8,424,979 B2 | 4/2013 | Tani | |
| 8,561,402 B2 * | 10/2013 | Dunlap, III | B60T 11/22 |
| | | | 60/588 |
| 8,672,422 B2 | 3/2014 | Tamura | |
| 8,893,859 B2 * | 11/2014 | Wang | B60T 11/16 |
| | | | 188/24.22 |
| 9,139,176 B2 | 9/2015 | Nishikawa et al. | |
| 9,187,069 B2 | 11/2015 | Nishikawa et al. | |
| 9,358,965 B2 | 6/2016 | Nishikawa et al. | |
| 9,567,032 B2 | 2/2017 | Nagai et al. | |
| 9,932,086 B2 | 4/2018 | Barnett | |
| 10,189,539 B2 * | 1/2019 | Ruopp | B60T 11/22 |

* cited by examiner

MOTORCYCLE PARKING BRAKE DEVICE

REFERENCE TO RELATED APPLICATION

Applicant claims the benefit of U.S. Provisional Patent Application Ser. No. 62/634,882 filed Feb. 25, 2018 and entitled BULLET BRAKE.

TECHNICAL FIELD

This invention relates generally to a brake device, and more particularly to a parking brake device for a motorcycle.

BACKGROUND OF INVENTION

Motorcycles typically have a front wheel brake that is controlled through a hand lever and a rear wheel brake that is controlled through a foot lever. The front brake and rear brake are usually applied simultaneously to provide a smooth and even braking of the motorcycle.

When the motorcycle is parked, especially on an inclined surface, the motorcycle's transmission is left in gear to prevent the rear wheel from rolling. A problem however exists with automatically shifting motorcycle transmissions, because the centrifugal clutch of the automatically shifting transmission does not engage the engine and transmission at idle or when the engine is not running, the automatic transmission does not prevent the rolling of the rear wheel. As such, the motorcycle may move when parked, causing it to tip over and/or crash.

One solution to this problem has been to engage the front brake through the manual pulling of the brake hand lever and then strapping down the hand lever in the pulled or engaged position. This solution is not practical. Furthermore, should the strap become lose, the brake will become disengaged and the motorcycle may accidentally move.

Accordingly, it is seen that a need remains for a motorcycle parking brake which is easy to engage and disengage to prevent the motorcycle from moving while parked. It is to the provision of such therefore that the present invention is primarily directed.

SUMMARY OF THE INVENTION

In a preferred form of the invention a motorcycle parking brake device is adapted to be coupled to a threaded opening of a master cylinder and a brake line of a motorcycle braking system. The motorcycle parking brake device comprises a bolt portion having a stem extending to a head. The stem has external threads configured to be threadably received within the master cylinder internally threaded opening. The stem has a stem channel having a first opening in fluid communication with the master cylinder and a second opening in fluid communication with the brake line. The braking device also has a plunger positioned within the stem channel of the bolt portion for reciprocal movement between a disengaged position and an engaged position. The plunger includes a piston positioned to allow fluid communication between the stem channel first opening and the stem channel second opening when the plunger is in the disengaged position and positioned to prevent fluid communication between the stem channel first opening and the stem channel second opening when the plunger is in the engaged position.

DETAILED DESCRIPTION

Figure 1:
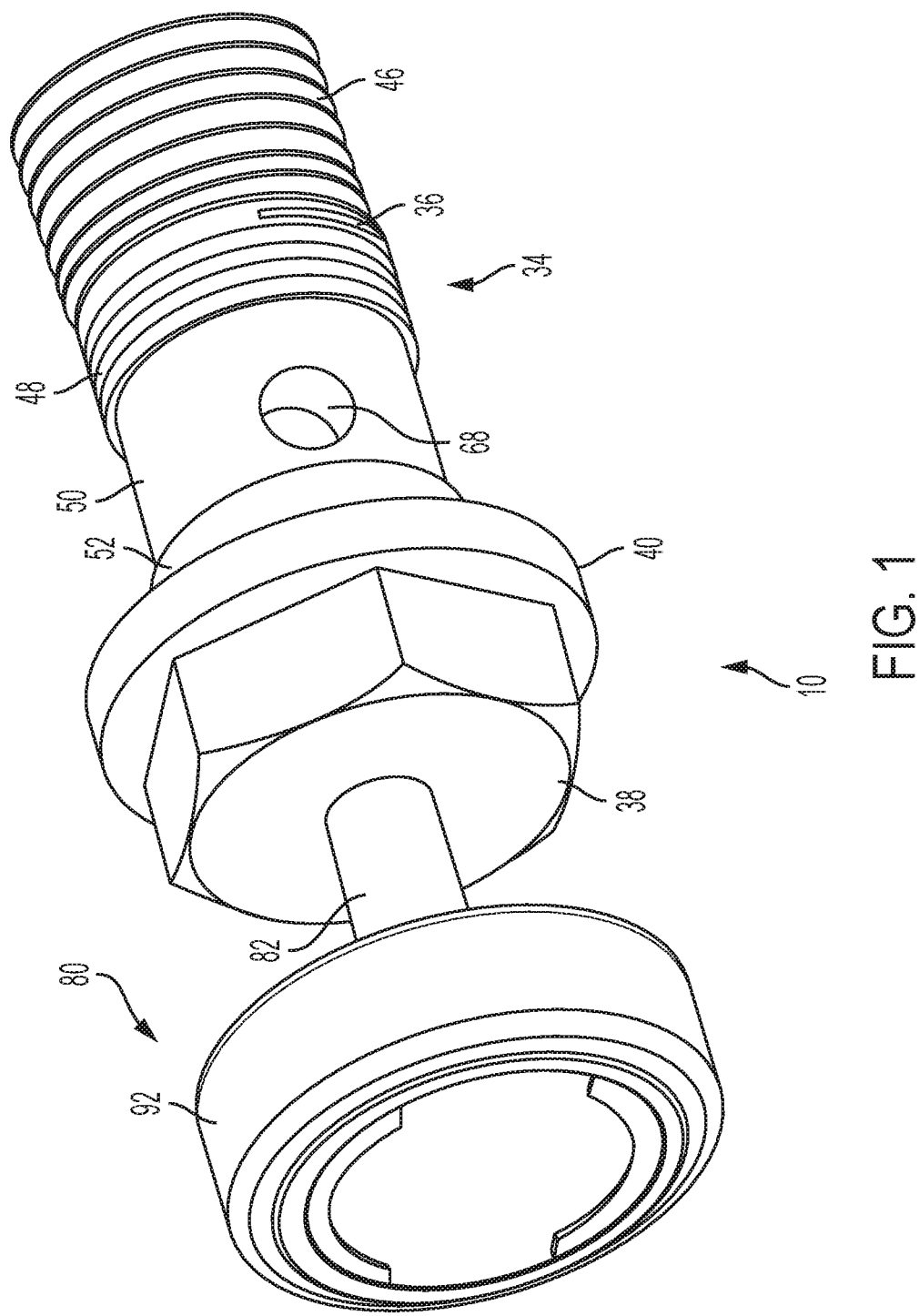
FIG. 1 is a perspective view of the motorcycle parking brake device embodying principles of the invention in a preferred form.

With reference next to the drawings, there is shown a motorcycle parking brake device 10 according to the present invention. The motorcycle parking brake device 10 may be retrofitted to an existing front brake 12 of a motorcycle or may be part of the original manufacturing of the motorcycle, hereinafter referenced simply as "brake device" 10. The motorcycle conventional braking system includes a bracket coupled to the handlebar, a master cylinder 14, a pivotal hand lever 16, and a hydraulic piston or plunger mounted within the master cylinder 14. The master cylinder 14 has a threaded hydraulic fluid pressure opening 18 in which is mounted a banjo bolt of a banjo bolt fitting 20. The banjo bolt fitting 20 includes an annular fluid channel 21. The banjo bolt fitting 20 extends to and is coupled to a hydraulic brake line 22 which in turn extends to the brake calipers 24 having reciprocating caliper pistons 26 which engage brake pads 28 which are biased against a brake rotor or disk 30. Thus, the hydraulic brake line 22 is in fluid communication with the fluid channel 21 of the banjo bolt fitting 20. The conventional motorcycle braking system is described in detail in U.S. Pat. Nos. 9,932,086 B2 and 6,871,729 B2 which is specifically incorporated herein in their entireties by reference.

The motorcycle parking brake device 10 is fitted or retrofitted to the master cylinder 14 and the banjo bolt fitting 20. The brake device 10 includes a bolt portion 34 which replaces the banjo bolt of a conventional brake system. The bolt portion 34 has a stem or stem portion 36 which extends to a hexagonal head 38 having a cylindrical shoulder or flange 40. The stem portion 36 includes an externally threaded portion 46, a cylindrical first seat 48 adjacent the threaded portion 46, a cylindrical recessed portion 50 adjacent the first seat 48, and a cylindrical second seat 52 positioned between the recessed portion 50 and the shoulder 40 of the head 38. The recessed portion 50 forms an annular fluid channel or recess.

The stem portion 36 has a round, central, longitudinal stem channel or passage 56 of a first select diameter extending from a first end, channel opening, or stem opening 58 of the stem portion 36 to a position approximate a second end 60 of the stem portion 36 located approximately at the head 38. The central stem channel 56 includes an O-ring slot 64 positioned approximately midway between the first end 58 and the second end 60. A resilient O-ring seal 66 is fitted within O-ring slot 64. A hydraulic fluid side opening 68 extends through the recessed portion 50 of the stem portion 36 and into the stem channel 56 between the second end 60 and the O-ring seal 66.

The central stem channel 56 extends to and is in fluid communication with a round, longitudinal head channel 70. The head channel 70 extends to a head channel opening 72. The head channel 70 includes two O-ring slots 74 each having a resilient O-ring seal 76 mounted therein. The select diameter of the head channel 70 is smaller than the select diameter of the stem channel 56.

Figure 2:
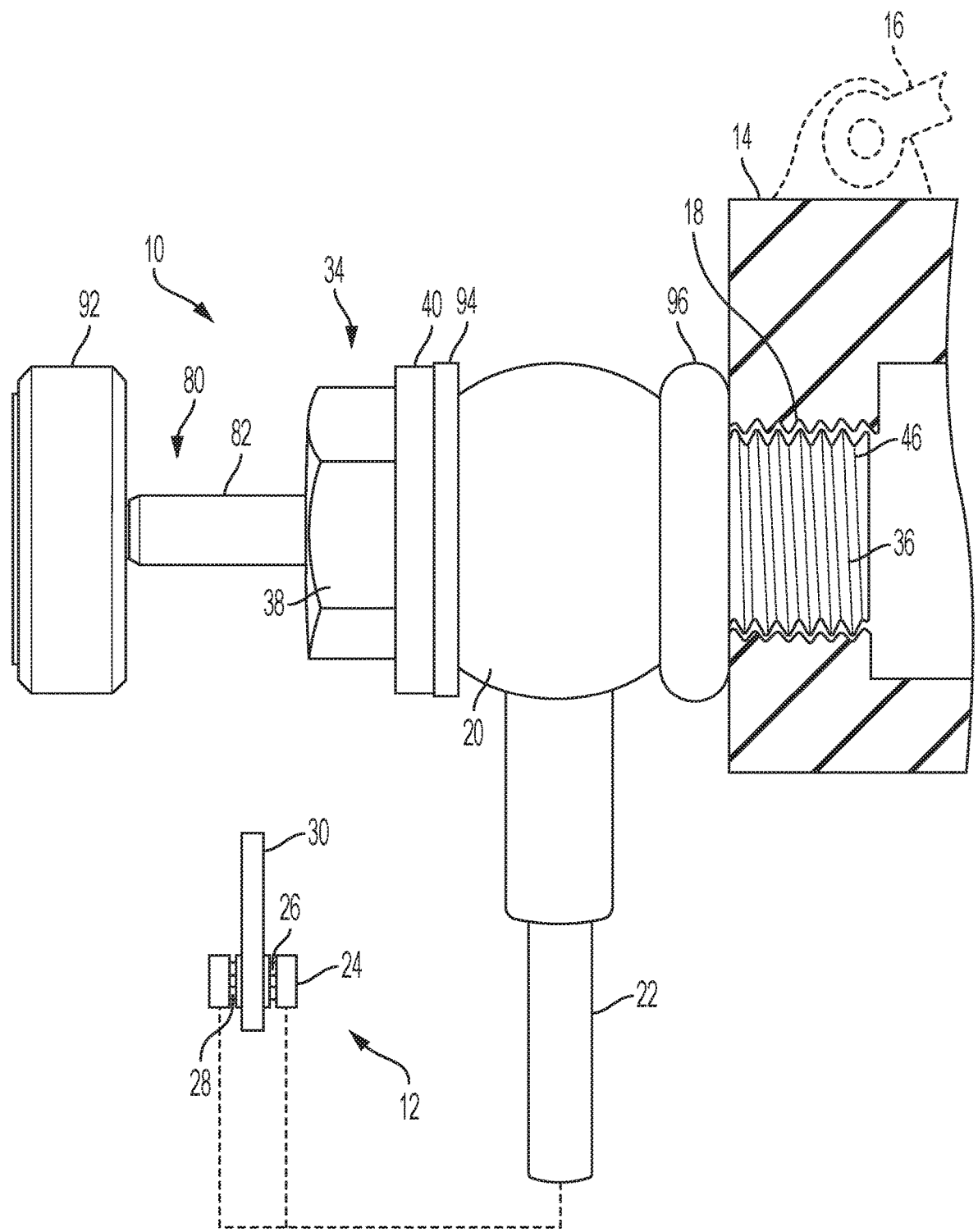
FIG. 2 is a top view of the motorcycle parking brake device of FIG. 1, showing schematically other components of the braking system of a motorcycle.
Figure 3:
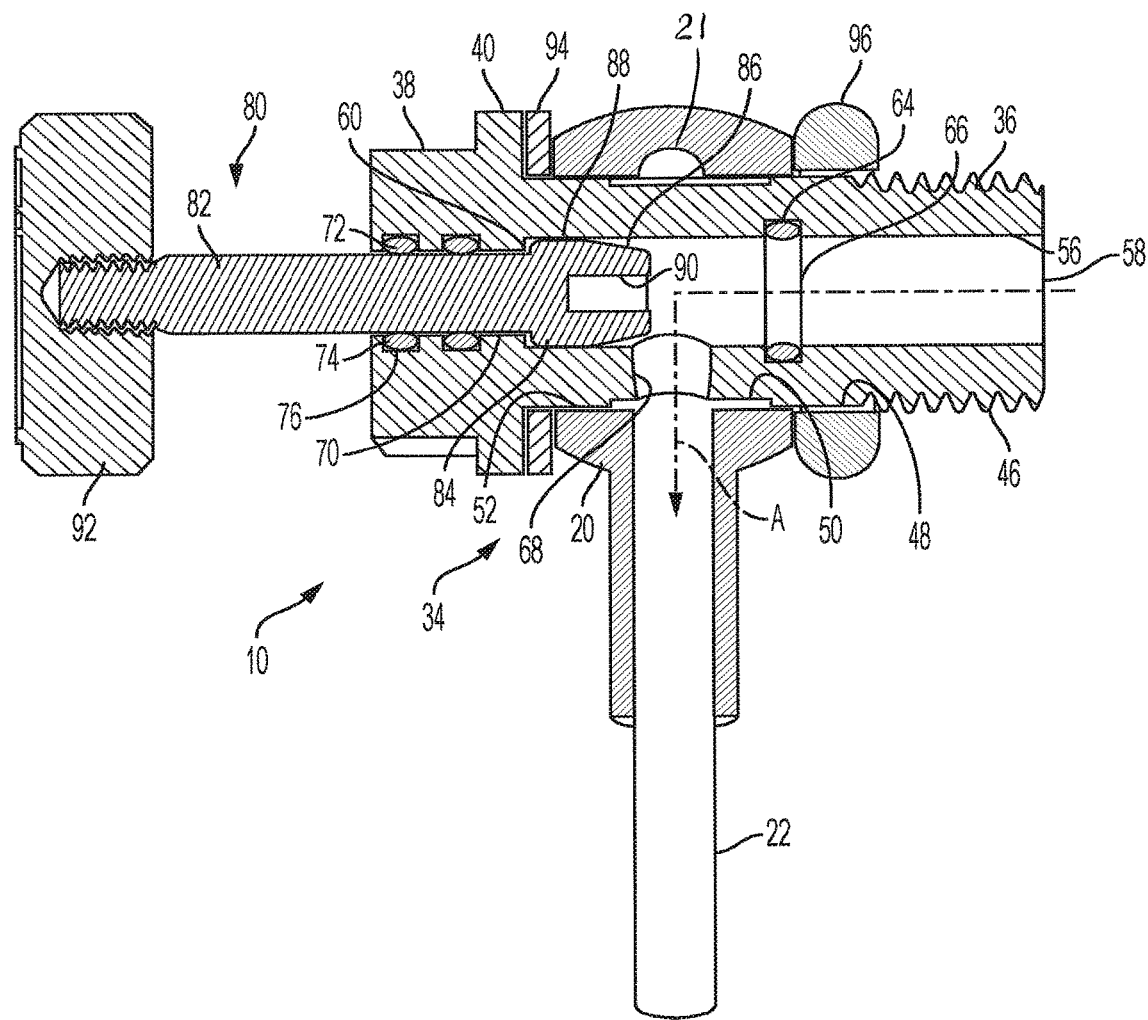
FIG. 3 is a cross-sectional view of the motorcycle parking brake device of FIG. 1, shown in a braking disengaged configuration.
Figure 4:
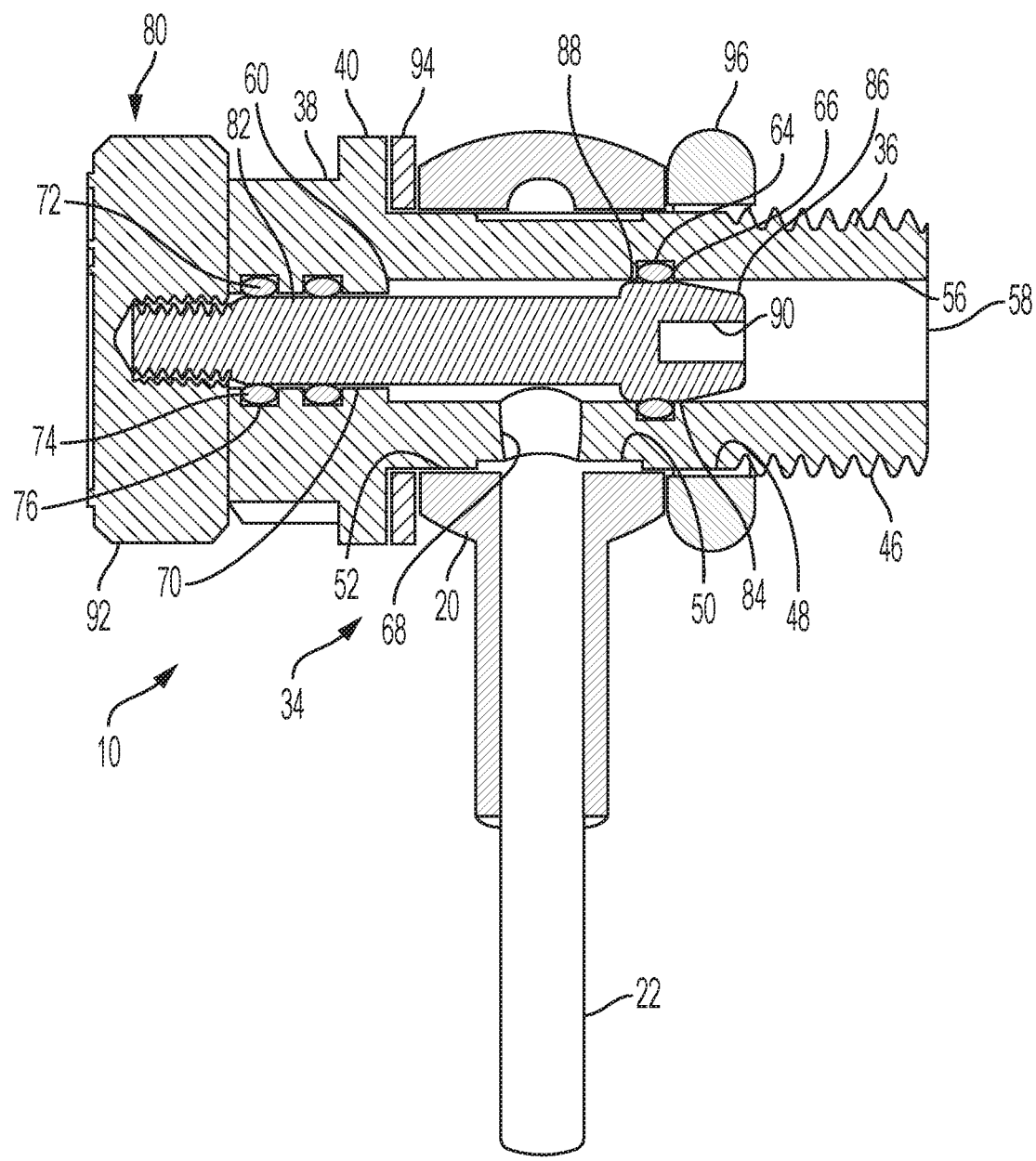
FIG. 4 is a cross-sectional view of the motorcycle parking brake device of FIG. 1, shown in a braking engaged configuration.

A plunger 80 is coupled to the bolt portion 34 for reciprocal movement between a inactive or disengaged position, shown in FIGS. 1-3, and an active or engaged position, shown in FIG. 4. The plunger 80 has a shaft or shank 82 journalled within the head channel 70 and O-rings 76 for reciprocal movement therein. The plunger 80 also has an enlarged piston, stopper or tip 84 which resides within the stem channel 56 for reciprocal movement therein.

The piston 84 includes a tapered end 86 extending to a cylindrical follower 88. A tool channel 90 extends into the piston 84. The plunger 80 also has a cap, push plate or flange 92 mounted to the shank 82 oppositely disposed from the piston 84. The O-rings seals 66 and 76 may be made of a polymer material, such as ethylene propylene rubber.

The brake device 10 also has a washer or seal 94 fitted about the exterior of the second seat 52 of the stem portion 36. The seal 94 may be made of a metal, such as brass. The brake device 10 also has a resilient D-ring seal 96 fitted about the exterior of the first seat 48 of the stem portion 36. The D-ring seal 96 may be made of a polymer material, such as ethylene propylene rubber.

In use, the seal 94 is journalled onto the stem portion second seat 52 in abutment with the shoulder 40 of the head 38. The banjo bolt fitting 20 is journalled onto the stem portion 36 in a position over a portion of the second seat 52, the recessed portion 50 and hydraulic fluid side opening 68, and a portion of the first seat 48. The banjo bolt fitting 20 is in abutment with the seal 94. The fluid channel 21 of the banjo bolt fitting 20 is in register with and in fluid communication with the recessed portion 50 and the hydraulic fluid side opening 68. The D-ring seal 96 is journalled onto the first seat 48 of the stem portion 36 and in abutment with the banjo bolt fitting 20 oppositely disposed from the seal 94.

The brake device 10 is mounted to a motorcycle by threading the stem portion 36 of the bolt portion 34 into the opening 18 of the master cylinder 14, as shown in FIGS. 2 and 3. Thus, the banjo bolt fitting 20 is sealed to the brake device 10 through the tight, sealed fitting or compression of the D-ring seal 96 and seal 94. The two O-ring seals 76 about the plunger shank 82 prevent fluid from passing between the bolt portion 34 and the plunger 80.

With the plunger 80 in its disengaged position, shown in FIGS. 1-3, the actuation of the brake system's hand lever 16 causes the brake fluid within the master cylinder 14 to be pressurized. The pressurized brake fluid flows through the stem channel 56, through the hydraulic fluid side opening 68 within the recess portion 50, through the fluid channel 20 of the banjo bolt fitting 20, and into the hydraulic brake line 22, as shown by arrow A in FIG. 3. The pressurized brake fluid within the hydraulic brake line 22 forces the brake pistons 26 within the brake calipers 24 outwardly, thereby pushing the brake pads 28 against the brake rotor so as to restrict rotary movement of the brake rotor, i.e., the front brake system is pressurized to actuate the front brakes to prevent the motorcycle from moving. Thus, the braking system operates in its normal capacity.

To engage the parking brake capacity of the braking device 10, the brake system is pressurized through the actuation of the front brake hand lever 16. The operator then pushes upon the push plate 92 to move the plunger 80 from its disengaged position, shown in FIGS. 1-3, to its engaged position shown in FIG. 4. With the plunger now in its engaged position, the piston 84 of the plunger 80 is sealably positioned within the O-ring seal 66, specifically, the cylindrical follower 88 portion of the piston 84 if fitted within the O-ring seal 66 to provide a good seal therebetween. This position of the piston 84 maintains the hydraulic brake line 22, banjo bolt fitting 20, and portion of the stem channel 56 between the piston 84 and the second end 60 under high pressure so as to maintain the outward position of the brake pistons 26 against the brake pads 28, which pushes against the brake rotor 30 to prevent movement of the rotor 30. This positioning of the piston 84 maintains this pressurized condition regardless of the resting position of the brake hand lever 16. As such, the brake hand lever 16 may now be released and yet the motorcycle's front brake or front brake system 12 is still actuated to prevent movement of the motorcycle, i.e., the parking brake is set or actuated.

The release of the brake hand lever 16 depressurizes the hydraulic fluid within the master cylinder 14 and portion of the stem channel 56 between the O-ring seal 66 and the first end 58 of the stem channel 56. Thus, a high pressure zone is maintained between the O-ring seal 66 and the stem channel second end 60 and a low pressure zone is created between the O-ring seal 66 and the stem channel first end 58. The difference in these two pressure zones on either side of the piston 84 maintains the piston 84, and thus the plunger 80, in the engaged position.

To disengage the braking system or parking brake capacity of the motorcycle, the operator pulls or actuates the hand lever 16 causing the master cylinder 14 to once again pressurize the hydraulic brake fluid therein, as well as the brake fluid within the stem channel 56 between the O-ring seal 66 and the first end 58. This higher or increased pressurization of the hydraulic brake fluid overcomes the static, high pressure between the O-ring seal 66 and the second end 60 so as to cause the plunger 80 to move back to its disengaged position shown in FIGS. 1-3. Once the plunger 80 is back to its disengaged position, the motorcycle's braking system works in normal fashion again.

It should be understood that as the brake device 10 controls the flow of pressurized hydraulic fluid from the master cylinder 14 to the brake line 22, and further to the brake calipers 24 and pistons 26, the brake device 10 works as a control valve which allows or prevents the flow of hydraulic fluid into the brake line (between the master cylinder and the brake line). Thus, it should be understood that other similar devices may be used as a substitute for the structure of the plunger of the present embodiment, including but not limited to butterfly type valves, ball valves or the like.

It should also be understood that the brake device 10 may be fitted to other types of hydraulic line couplers and is not limited to the coupling to a banjo bolt fitting.

It should also be understood that while the preferred embodiment shows the brake device 10 coupled to the motorcycles front braking system, the brake device 10 may also be adapted to be coupled to the rear braking system of a motorcycle.

It should be understood that as the stem channel 56 and the head channel 70 co-extend from each other, each may be considered to be one in the same or a part of the other. In other words, the stem channel 56 may be considered to be a portion of the head channel 70, and visa-versa, and the combination may be referenced by either term.

It thus is seen that a motorcycle parking brake device is now provided which overcomes problems associated with the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. A motorcycle parking brake device which is adapted to be coupled to an internally threaded opening of a master cylinder and a brake line of a motorcycle braking system, the motorcycle parking brake device comprising,
   a bolt portion having a stem extending to a head, said stem having external threads configured to be threadably received within the master cylinder internally threaded opening, said stem having a stem channel having a first opening in fluid communication with the master cylinder and a second opening in fluid communication with the brake line, and
   a plunger positioned within said stem channel of said bolt portion for reciprocal movement between a disengaged position and an engaged position, said plunger having a piston positioned to allow fluid communication between said stem channel first opening and said stem channel second opening when said plunger is in said disengaged position and positioned to prevent fluid communication between said stem channel first opening and said stem channel second opening when said plunger is in said engaged position.

2. The motorcycle parking brake device of claim 1 further comprising a first plunger seal positioned within said stem channel between said stem channel first opening and said stem channel second opening, said first plunger seal being configured to cooperate with said piston to form a pressure seal.

3. The motorcycle parking brake device of claim 2 wherein said first plunger seal is an O-ring configured to receive a portion of said piston therein.

4. The motorcycle parking brake device of claim 2 further comprising a second plunger seal positioned about said plunger to create a pressure seal between said plunger and said bolt portion located between said piston and a plunger push plate distal said piston.

5. The motorcycle parking brake device of claim 1 further comprising a first brake line seal mounted about said stem in a position between the brake line and the master cylinder.

6. The motorcycle parking brake device of claim 5 further comprising a second brake line seal positioned about said stem between the brake line and said head.

7. A motorcycle parking brake device which is adapted to be coupled to a pressure opening of a master cylinder and a brake line of a motorcycle braking system, the motorcycle parking brake device comprising,
   a bolt portion having a head and a stem mountable to the motorcycle master cylinder, said bolt portion having a longitudinal channel therethrough extending from a stem opening to a head opening, said bolt portion also having a side opening positioned between said stem opening and said head and extending through said stem in fluid communication with said longitudinal channel and the motorcycle brake line, and
   a plunger positioned within said longitudinal channel of said bolt portion, said plunger having a piston mounted for reciprocal movement between a disengaged position wherein said piston is positioned between said side opening and said head opening and an engaged position wherein said piston is positioned between said side opening and said stem opening,
   whereby when the piston is in its disengaged position fluid from the motorcycle master cylinder passes into the longitudinal channel through the stem opening, through the side opening, and into the brake line, and when the piston is in its engaged position fluid from the motorcycle master cylinder is prevented from passing through the side opening.

8. The motorcycle parking brake device of claim 7 wherein said stem has external threads configured to be threadably received within the pressure opening of the master cylinder.

9. The motorcycle parking brake device of claim 7 further comprising a first plunger seal positioned within said longitudinal channel between said stem opening and said side opening, said first plunger seal being configured to cooperate with said piston to form a pressure seal.

10. The motorcycle parking brake device of claim 9 wherein said first plunger seal is an O-ring configured to receive a portion of said piston therein.

11. The motorcycle parking brake device of claim 9 further comprising a second plunger seal positioned about said plunger to create a pressure seal between said plunger and said bolt portion located between said side opening and said head opening.

12. The motorcycle parking brake device of claim 7 further comprising a first brake line seal mounted about said stem in a position between the brake line and the master cylinder.

13. The motorcycle parking brake device of claim 12 further comprising a second brake line seal mounted about said stem between the brake line and said head.

14. A motorcycle parking brake device which is adapted to be coupled to a pressure opening of a master cylinder and a brake line of a motorcycle braking system, the motorcycle parking brake device comprising,
   a bolt portion having a head and a stem mountable to the pressure opening of the master cylinder, said bolt portion having a longitudinal channel therethrough extending from a stem opening, said bolt portion also having a side opening positioned between said stem opening and said head and said side opening extending through said stem in fluid communication with said longitudinal channel and the brake line, and
   a valve mounted to said bolt portion, said valve controlling the flow of pressurized fluid from the motorcycle master cylinder to the motorcycle brake line, the valve having a first position wherein fluid is allowed to pass through the longitudinal channel and through the side opening and a second position wherein fluid is not allowed to pass through the longitudinal channel and side opening, said valve is a plunger positioned within said longitudinal channel of said bolt portion, said plunger having a piston mounted for reciprocal movement between said valve first position wherein said piston is positioned between said side opening and said head and said valve second position wherein said piston is positioned between said side opening and said stem opening.

15. The motorcycle parking brake device of claim 14 wherein said stem has external threads configured to be threadably received within the pressure opening of the master cylinder.

16. The motorcycle parking brake device of claim 14 further comprising a first plunger seal positioned within said longitudinal channel between said stem opening and said side opening, said first plunger seal being configured to cooperate with said piston to form a pressure seal.

17. The motorcycle parking brake device of claim 16 wherein said first plunger seal is an O-ring configured to receive a portion of said piston therein.

18. The motorcycle parking brake device of claim 16 further comprising a second plunger seal positioned about said plunger to create a pressure seal between said plunger and said bolt portion located between said side opening and said head.

19. The motorcycle parking brake device of claim 14 further comprising a first brake line seal mounted about said stem in a position between the brake line and the master cylinder.

20. The motorcycle parking brake device of claim 19 further comprising a second brake line seal mounted about said stem between the brake line and said head.

\* \* \* \* \*